3,647,762
COPOLYAMIDEIMINE AND COPOLYAMIDEBENZ-
IMIDAZOLE, AND PROCESSES FOR THEIR
PREPARATION
Shigeyoshi Hara, Masao Senoo, Tsunemasa Yoshida, and
Moriya Uchida, Tokyo, Japan, assignors to Teijin
Limited, Osaka, Japan
No Drawing. Filed Jan. 26, 1970, Ser. No. 5,973
Int. Cl. C08g 20/32
U.S. Cl. 260—78 TF   13 Claims

ABSTRACT OF THE DISCLOSURE

A novel film-forming aromatic copolyamideimine is provided by reacting 2,4-diaminodiphenylamine or its derivative, an aromatic diamine such as metaphenylene diamine and a benzenedicarboxylic dichloride such as terephthaloyl dichloride. The copolyamideimine is soluble in various organic solvents and easily molded into shaped articles, and can be converted to a thermally stable copolyamidebenzimidazole by heating, preferably in the presence of an acid substance.

---

This invention relates to copolyamideimine and copolyamidebenzimidazole of excellent workability and heat resistance, and also to the processes of their preparation.

More particularly, this invention relates to copolymerized, aromatic polyamideimines derived from the following three components, i.e.

(1) as an acid component, terephthaloyl chloride and/or isophthaloyl chloride or derivatives thereof, and
(2) as the amine component
  (a) 2,4-diaminodiphenylamine or derivatives thereof, and
  (b) an aromatic diamine, as well as copolymerized, aromatic polyamidebenzimidazoles which are the dehydrated, ring-closed products of the copolyamideimines, and to the processes for their preparation.

Preparation of aromatic polyamides by polycondensation of an aromatic diamine with terephthaloyl chloride or isophthaloyl chloride is known. As the aromatic diamines used for that purpose, for example, the compounds of the formula:

$$H_2N-X-NH_2$$

in which X is a phenylene group, biphenylene group, naphthylene group, or a divalent atomic group of the formula,

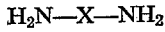

in which Y is an alkylene group of 1–3 carbons, —O—, —S—,

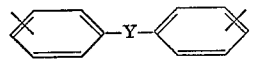

—SO₂—, or —C—,
            ‖
            O are among the most typical. Aromatic polyamides derived from such aromatic diamines and terephthaloyl chloride and/or isophthaloyl chloride generally possess high melting points and excellent heat stability, but are defective in that their solubility in solvents is low, and moldability or workability is poor.

For example, poly-m-phenyleneisophthalamide exhibits only limited solubility even in such strong solvents as N-methylpyrrolidone, N,N-dimethylacetamide, dimethylformamide, dimethylsulfoxide, etc., and it is extremely difficult to obtain a high concentration, stable solution that will withstand storage over prolonged periods. Such low solubility is not unique to poly-m-phenyleneiso-phthalamide alone, but is more or less a common property among all of the above-described aromatic polyamides.

Accordingly, various proposals have been heretofore made for improving the solubility of such aromatic polyamides. One of the proposals recommends addition of an inorganic salt, such as lithium chloride, to an organic solvent as above-named, in advance of dissolving an aromatic polyamide therein. However, such a practice requires an additional leaching step after the preparation of the shaped product by dry or wet process, to remove the residual inorganic salt. Consequently, the solution is hardly usable for coatings particularly for electrically insulating coatings, and in practice is used only as a fiber-forming solution.

Another proposal comprises preparation of a copolyamide by the copolycondensation of terephthaloyl chloride and isophthaloyl chloride at specific ratios, for example, 25–55 mol percent of the former and 75–45 mol percent of the latter, with an aromatic diamine. However, such copolyamide exhibits a lowered softening point compared with an aromatic homopolyamide. That is, the intended improvement in solubility is achieved only at the cost of valuable heat resistance.

Accordingly, the object of the present invention is to provide copolymerized, aromatic polyamides having high solubility in solvents and excellent molding workability (hereinafter referred as aromatic copolyamideimine), aromatic copolyamidebenzimidazoles of excellent heat stability derived from the aromatic copolyamideimine, and also shaped articles thereof.

Another object of the invention is to provide processes for the preparation of such copolyamideimine and copolyamidebenzimidazole.

Other objects and advantages of the invention will become more apparent from the following description.

[Aromatic copolyamideimines of the invention]

According to the invention, film-forming, aromatic copolyamideimines are formed by reacting (A) at least one aromatic triamine of the formula,

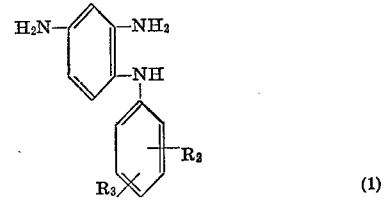

(1)

in which $R_2$ and $R_3$ each stands for a hydrogen atom or a non-reactive atomic group, which may be same or different, and (B) at least one aromatic diamine of the formula $$H_2N-X-NH_2 \qquad (2)$$

in which X is a member of the group consisting of a phenylene group, biphenylene group, naphthylene group, and divalent atomic groups of the formula

wherein Y is selected from the group consisting of alkylene groups of 1–3 carbons, —O—, —S—, —SO₂—

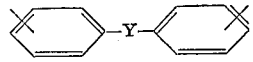

and 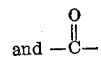

and in which 1–2 hydrogen atoms linked with the nuclear carbons in the aromatic rings may be substituted with halogen atom, methyl group or methoxy group, at a ratio of 15–75 mol percent of the (A) aromatic triamine to 85–25 mol percent of the (B) aromatic diamine, the total being invariably 100 mol percent, with at least one dichloride of a benzenedicarboxylic acid of the formula

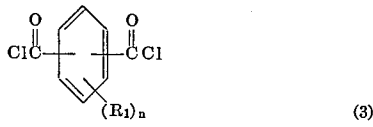

in which

stands for a metal-phenylene or paraphenylene group,
$R_1$ stands for a methyl group or halogen atom, and
$n$ is an integer of 0–2, $(R_1)_n$ representing a hydrogen atom when $n$ equals zero,
in an inert organic solvent in the presence of an acid acceptor, at temperatures ranging from $-20°$ to $50°$ C.

The above aromatic copolyamideimine exhibiting film-forming ability prepared in accordance with the invention is characterized in that the same is composed essentially of 15–75 mol percent of an aromatic amideimine structural unit of the formula

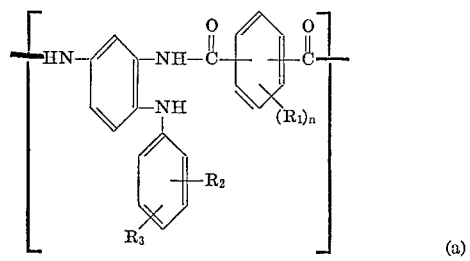

in which

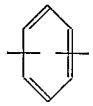

stands for a metal-phenylene and/or paraphenylene group,
$R_1$ is a methyl group or halogen atom,
$n$ is 0, 1, or 2 $(R_1)_n$ standing for a hydrogen atom when $n=0$,
and
$R_2$ and $R_3$ may be same or different, and each stands for a hydrogen atom or a non-reactive atomic group, and 85–25 mol percent of an aromatic amide structural unit of the formula

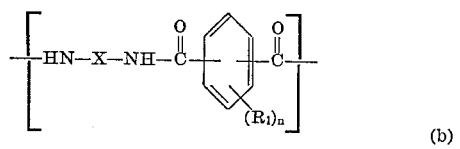

in which

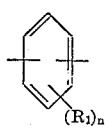

has the same definition in Formula a, and X is an atomic group selected from the group consisting of a phenylene group, biphenylene group, naphthylene group, and divalent atomic group of the formula

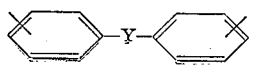

wherein —Y— is selected from the group consisting of an alkylene group of 1–3 carbons, —O—, —S—, —SO$_2$—, and

in the atomic group 1–2 hydrogen atom or atoms linked with nuclear carbons in the aromatic rings being optionally substituted with a halogen, methyl or methoxy group.

The reason why the above copolyamideimine is obtained as a linear polymer, which is free from crosslinking and has good solubilities in organic solvents, in spite of employing the triamine as one of the starting materials, which may act as trifunctional compound in the reaction with the acid chloride, is as follows. Since the aromatic triamine of Formula 1 has one secondary amino group of the diarylamine type and two primary amino groups, and furthermore the secondary amino group is linked with the nuclear carbon atom adjacent that in the aromatic ring to which either one of the primary amino groups is linked, the two primary amino groups not being located at adjacent positions, when such an aromatic triamine is reacted with the benzenedicarboxylic acid dichloride at low temperatures, the two primary amino groups react with the dicarboxylic acid dichloride predominantly over the secondary amino group. Synthesis of linear, high-molecular-weight polymers utilizing the reactivity of such aromatic triamine is clarified for the first time through research associated with the present invention.

Hereinafter the starting materials used in the preparation of above aromatic copolyamideimine in accordance with the present invention will be explained.

(I–1) Aromatic triamine

The aromatic triamine of the Formula 1

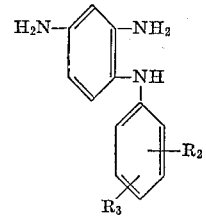

in which $R_2$ and $R_3$ each stand for hydrogen or a non-reactive atomic group, which may be same or different, which is used as one of the starting components in the preparation of above film-forming, aromatic copolyamideimine of the present invention is 2,4-diaminodiphenylamine, or a derivative thereof having non-reactive substituent groups. The non-reactive substituent groups represented by $R_2$ and $R_3$ in the above Formula 1, are not limited to any specific groups, as long as they do not substantially react with terephthaloyl chloride, isophthaloyl chloride, or derivatives thereof having non-reactive substituent groups, of Formula 3

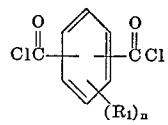

in which

and $(R_1)_n$ are as previously defined, under the reaction conditions for making the aromatic copolyamideimine of the present invention. Accordingly, referring to the foregoing Formula 1, $R_2$ and $R_3$ may be, for example, halogen atoms, alkyl groups of 1–3 carbons, alkoxy groups of 1–3 carbons, aryloxy groups of 6–12 carbons, carboalkoxy groups of 2–4 carbons, carboaryloxy groups of 7–13 carbons, carbamide groups of 1–7 carbons, acyloxy groups of 1–7 carbons, etc., and also either one or both of $R_2$ and $R_3$ may be a hydrogen atom. As already stated, $R_2$ and $R_3$ may be the same or different.

Particularly preferred atoms or atomic groups for $R_2$ and/or $R_3$ are a hydrogen atom, chlorine atom, bromine atom, methyl group, methoxy group and phenoxy group.

Examples of such aromatic triamines include the compounds below:

| | | |
|---|---|---|
| (101) | $H_2N$—⟨⟩(—$NH_2$)—NH—⟨⟩ | 2,4-diaminodiphenylamine. |
| (102) | $H_2N$—⟨⟩(—$NH_2$)—NH—⟨⟩—Cl | 4'-chloro-2,4-diaminodiphenylamine. |
| (103) | $H_2N$—⟨⟩(—$NH_2$)—NH—⟨⟩(—Cl) | 3'-chloro-2,4-diaminodiphenylamine. |
| (104) | $H_2N$—⟨⟩(—$NH_2$)—NH—⟨⟩(—Cl) | 2'-chloro-2,4-diaminodiphenylamine. |
| (105) | $H_2N$—⟨⟩(—$NH_2$)—NH—⟨⟩—Br | 4'-bromo-2,4-diaminodiphenylamine. |
| (106) | $H_2N$—⟨⟩(—$NH_2$)—NH—⟨⟩—I | 4'-iodo-2,4-diaminodiphenylamine. |
| (107) | $H_2N$—⟨⟩(—$NH_2$)—NH—⟨⟩(—Cl, —Cl) | 2',3'-dichloro-2,4-diaminodiphenylamine. |
| (108) | $H_2N$—⟨⟩(—$NH_2$)—NH—⟨⟩(—Cl, —Cl) | 2',5'-dichloro-2,4-diaminodiphenylamine. |
| (109) | $H_2N$—⟨⟩(—$NH_2$)—NH—⟨⟩(—Cl)—Cl | 3',4'-dichloro-2,4-diaminodiphenylamine. |
| (110) | $H_2N$—⟨⟩(—$NH_2$)—NH—⟨⟩(—$CH_3$) | 2'-methyl-2,4-diaminodiphenylamine. |
| (111) | $H_2N$—⟨⟩(—$NH_2$)—NH—⟨⟩(—$CH_3$) | 3'-methyl-2,4-diaminodiphenylamine. |
| (112) | $H_2N$—⟨⟩(—$NH_2$)—NH—⟨⟩—$CH_3$ | 4'-methyl-2,4-diaminodiphenylamine. |
| (113) | $H_2N$—⟨⟩(—$NH_2$)—NH—⟨⟩(—$CH_3$)—$CH_3$ | 2',4'-dimethyl-2,4-diaminodiphenylamine. |
| (113) | $H_2N$—⟨⟩(—$NH_2$)—NH—⟨⟩—$OCH_3$ | 4'-methoxy-2,4-diaminodiphenylamine. |

| | | |
|---|---|---|
| (115) | H₂N—⌬—NH—⌬—O—⌬ (with NH₂ on first ring) | 4-(2,4-diaminoanilino)-diphenylether. |
| (116) | H₂N—⌬—NH—⌬—COOCH₃ (with NH₂ on first ring) | 4'-methoxycarbonyl-2,4-diaminodiphenylamine. |
| (117) | H₂N—⌬—NH—⌬—CO—O—⌬ (with NH₂ on first ring) | 4'-phenoxycarbonyl-2,4-diaminodiphenylamine. |
| (118) | H₂N—⌬—NH—⌬—NHCOCH₃ (with NH₂ on first ring) | 4'-acetamide-2,4-diaminodiphenylamine. |
| (119) | H₂N—⌬—NH—⌬—OCOCH₃ (with NH₂ on first ring) | 4'-acetoxy-2,4-diaminodiphenylamine. |

(I-2) Aromatic diamines

As the starting components for the preparation of the aromatic copolyamideimines of the present invention, at least one aromatic diamine of Formula 2 is used:

$$H_2N-X-NH_2 \quad (2)$$

in which X is a member the group consisting of phenylene group, biphenylene group, naphthylene group, and divalent atomic groups of the formula

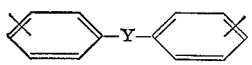

wherein Y is selected from the group consisting of alkylene groups of 1-3 carbons, —O—, —S—, —SO₂—, and

Any known aromatic diamine can be used, except those in which the two free amino groups (—NH₂) are linked with two adjacent nuclear carbon atoms or with two nuclear carbon atoms at the peri position in the aromatic ring. Also in such aromatic diamines the one or two hydrogen linked with the nuclear carbons of the aromatic rings may be substituted with a halogen atom, preferably chlorine, methyl or methoxy group.

As specific examples of such aromatic diamines, the following compounds may be named:

| | | |
|---|---|---|
| (201) | ⌬ with NH₂ (top) and —NH₂ (bottom right) | m-Phenylenediamine. |
| (202) | ⌬ with NH₂ (top), —NH₂ (right), CH₃ (bottom) | 4-methyl-m-phenylenediamine. |
| (203) | ⌬ with NH₂ (top), —NH₂ (right), Cl (bottom) | 4-chloro-m-phenylenediamine. |
| (204) | ⌬ with NH₂ (top), H₃C— (left), —NH₂ (right), CH₃ (bottom) | 4,6-dimethyl-m-phenylenediamine. |
| (205) | ⌬ with NH₂ (top) and NH₂ (bottom) | p-Phenylenediamine. |

| | | |
|---|---|---|
| (206) | NH₂, CH₃, NH₂ (structure) | 2-methyl-p-phenylenediamine. |
| (207) | H₂N—⬡—⬡—NH₂ | Benzidine. |
| (208) | H₂N—⬡(CH₃)—⬡(CH₃)—NH₂ | 3,3'-dimethylbenzidine. |
| (209) | H₂N—⬡(Cl)—⬡(Cl)—NH₂ | 3,3'-dichlorobenzidine. |
| (210) | H₂N—⬡(CH₃O)—⬡(OCH₃)—NH₂ | 3,3'-dimethoxybenzidine. |
| (211) | H₂N—⬡—C(CH₃)₂—⬡—NH₂ | 4,4'-diaminodiphenylpropane. |
| (212) | H₂N—⬡—CH₂—⬡—NH₂ | 4,4'-diaminodiphenylmethane. |
| (213) | H₂N—⬡(Cl)—CH₂—⬡(Cl)—CH₂ | 3,3'-dichloro-4,4'-diaminodiphenylmethane. |
| (214) | H₂N—⬡—O—⬡—NH₂ | 4,4'-diaminodiphenylether. |
| (215) | H₂N—⬡—S—⬡—NH₂ | 4,4'-diaminodiphenylsulfide. |
| (216) | H₂N—⬡—SO₂—⬡—NH₂ | 4,4'-diaminodiphenylsulfone. |
| (217) | ⬡(NH₂)—SO₂—⬡(NH₂) | 3,3'-diaminodiphenylsulfone. |
| (218) | H₂N—⬡—CO—⬡—NH₂ | 4,4'-diaminobenzophenone. |
| (219) | ⬡(NH₂)—CO—⬡(NH₂) | 3,3'-diaminobenzophenone. |
| (220) | 1,5-diaminonaphthalene structure | 1,5-diaminonaphthalene. |

(I–3) Benzenedicarboxylic acid dichloride

According to the invention, the aromatic triamine of Formula 1 and aromatic diamine of Formula 2 are reacted with at least one benzenedicarboxylic acid dichloride of Formula 3:

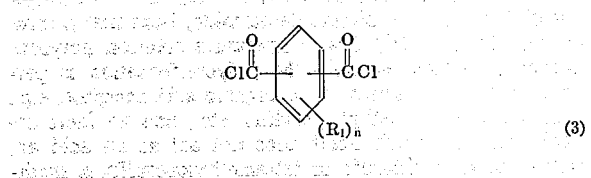

(3)

in which

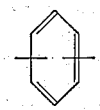

stands for a meta-phenylene or paraphenylene group; $R_1$ stands for a methyl group or halogen atom, preferably chlorine atom; $n$ is an integer of 0–2, and $(R_1)_n$ stands for hydrogen when $n=0$.

As more specific examples of such benzenedicarboxylic acid dichloride, for instance, the following compounds may be named:

| | | |
|---|---|---|
| (301) | ClOC–⟨⟩–COCl | Terephthaloyl dichloride. |
| (302) | ⟨⟩(COCl)(COCl) | Isophthaloyl dichloride. |
| (303) | Cl-⟨⟩(COCl)(COCl) | 5-chloroisophthaloyl chloride. |
| (304) | ClOC–⟨Cl⟩–COCl | 2-chloroterephthaloyl chloride. |
| (305) | ClOC–⟨Cl,Cl⟩–COCl | 2,5-dichloroterephthaloyl chloride. |
| (306) | ClOC–⟨CH₃⟩–COCl | 2-methylterephthaloyl chloride. |
| (307) | ClOC–⟨CH₃,CH₃⟩–COCl | 2,5-dimethylterephthaloyl chloride. |
| (308) | CH₃-⟨⟩(COCl)(COCl) | 4-methylisophthaloyl chloride. |
| (309) | CH₃-⟨CH₃⟩(COCl)(COCl) | 4,6-dimethylisophthaloyl chloride. |
| (310) | Br-⟨⟩(COCl)(COCl) | 5-bromo-isophthaloyl chloride. |

(I–4) Reaction conditions

According to the invention, the aromatic triamine of Formula 1 and aromatic diamine of Formula 2 as described above are polycondensed with the benzenedicarboxylic acid dichloride of Formula 3. In that step, when the total sum of the aromatic triamine and aromatic diamine is regarded as 100 mol percent, the two are used at such ratios that to 15–75 mol percent of the former, the latter ranges from 85 to 25 mol percent. Preferred quantitative ratios of the aromatic triamine to aromatic diamine is somewhat variable depending on the intended usage of the resulting aromatic copolyamideimine. If the copolyamideimine is to be shaped into the articles which are particularly required to have high heat resistance, use of a greater amount of aromatic triamine within the above-specified range is desirable. Whereas, when shaped articles of high tear strength and bending endurance are finally intended, a greater amount of the aromatic diamine should be used. It is normally preferred, however, to use 85–30 mol percent, particularly 80–55 mol percent, of aromatic diamine of the Formula 2, to 15–70 mol percent, particularly 20–65 mol percent, of the aromatic triamine of the Formula 1, the total being always 100 mol percent, in order to obtain shaped articles which exhibit excellent heat resistance as well as favorable physical properties.

Suitable amounts of the benzenedicarboxylic acid dichloride of Formula 3 to be polycondensed is approximately equimolar to the total amount of the aromatic triamine plus aromatic diamine.

Those three starting components are reacted in an inert, organic solvent in the presence of an acid acceptor, at temperatures ranging from −20° C.–+50° C., whereby the copolymerized, aromatic polyamideimine composed essentially of the structural unit (a) and the structural unit (b) is formed.

For the polycondensation of such copolymerized polyamideimine in accordance with the invention, methods normally employed for low temperature polycondensation of aromatic diamines with benzenedicarboxylic acid dihalides are generally applicable. For example, (i) the low temperature solution polycondensation process, using weakly basic amide-type solvent such as N - methylpyrrolidone, N,N - dimethylacetamide, hexamethylphosphoramide, etc., (ii) low temperature solution polycondensation process wherein the polycondensation is performed in the presence of an organic acid acceptor, e.g., triethylamine, N-methylpiperidine, etc., and an inert organic solvent, which itself does not act as an acid acceptor, such as chloroform tetramethylenesulfone, methyl ethyl ketone, etc.; (iii) interfacial polycondensation process in which an aqueous solution of acid accepter and oxygen-containing, inert organic solvent such as tetrahydrofuran, tetramethylenesulfone, cyclohexanone, methyl ethyl ketone, acetone, etc. are used, and (iv) a process going through the stage of an active intermediate product, may all be applied. The last-mentioned process involving an active intermediate product stage refers to a process which comprises the step of forming a reactive oligomer by reacting the aforesaid three components, i.e., the aromatic triamine, aromatic diamine, and benzenedicarboxylic acid dichloride, in an inert organic solvent which itself does not act as an acid acceptor, and subsequent completion of polymerization by contacting the oligomer with an aqueous solution of an organic or inorganic, preferably inorganic, acid acceptor to obtain the copolyamideimine of the present invention.

The interfacial polycondensation process of (iii), and (iv) the process going through the stage of active intermediate product can use an inexpensive inorganic acid acceptor, and normally the resulting polyamideimines in those processes are separated in the form of powder. Therefore, they are advantageously practiced when polymers should be further reacted or processed in bulk. Whereas, the solution polycondensation process of (i) above using an amide-type solvent has an advantage such that, since the resulting polymer is normally obtained as a homogeneous solution, the product can be directly utilized as the polymer solution for a shaping purpose.

A general method of making the aromatic copolyamideimine using the amide-type solvent as in (i) above will be explained hereinbelow.

Predetermined amounts of aromatic triamine and aromatic diamine are added to an amide-type solvent as above-described, and dissolved. The solution is preferably cooled to 10—−30° C., and into which benzenedicarboxylic acid dichloride is added as grains, melt, or solution in an inert organic solvent which is miscible with the amide-type solvent. Then the reaction mixture is stirred until the polymerization is completed. The preferred reaction temperature ranges from 0° to 30° C., within the normally employed range of −20°–50° C. The reaction time somewhat varies depending on reaction solvents, quantity thereof, reaction temperature, and required degree of polymerization of the product copolyamideimine, but is approximately 0.5–16 hours. At the end of the reaction, the copolyamideimine is obtained in the form of a homogeneous solution, which can be used directly as a shaping solution. In certain cases, however, such direct use may invite inconveniences such as corrosion, because normally hydrogen chloride remains in the system in the form of a salt with the amide-type solvent. In order to overcome that problem, amines or inorganic, basic substances may be added to the solution to form a salt which is insoluble in the solvent and subsequently removed by filtration, thereby providing a solution containing no residual acidic substances. It is also possible to pour the solution into a non-solvent, for example, water, to separate the copolyamideimine which may be subjected to further reaction or processing.

When the copolyamideimine is synthesized through the interfacial polycondensation process of (iii) above, the typical manner of practicing the process, i.e., use of the amine as an aqueous solution, is not advantageously applied, since the aromatic triamines employed as one of the starting materials in the invention are generally difficultly soluble in water.

Accordingly, advance addition of an organic solvent to the aqueous phase is adopted as the means for increasing solubility of the aromatic triamine therein. As the acid acceptors to be used in this process, sodium carbonate, sodium bicarbonate, potassium carbonate, magnesium carbonate, triethylamine, etc. are suited. Also as the organic solvent to be used in the reaction, tetrahydrofuran, propylene oxide, methyl ethyl ketone, acetone, cyclohexanone, tetramethylenesulfone, etc. are preferred. The reaction is normally practiced at temperatures ranging from −20° to 50° C. and is completed within approximately 10 minutes.

When the aromatic copolyamideimine is prepared through the stage of an active intermediate product as in (iv) above, first a mixture of the triamine and diamine is mixed with the benzenedicarboxylic acid dichloride in an inert organic solvent and reacted, to form an emulsion or solution containing the active intermediate product. Means of mixing is optional, while normally it is preferred to first form the solution of the benzenedicarboxylic acid dichloride and the solution of the amine mixture independently, and then mix the two solutions, for easier control of the reaction. The solution of the active intermediate product is contacted with an aqueous solution of acid acceptor under vigorous stirring, to complete the polycondensation reaction. The conditions at the end of reaction, reaction temperature and time, etc., are substantially similar to those of the interfacial polycondensation process, and the types of preferred reaction solvents and acid acceptors also substantially correspond. In both processes, generally the polymers are produced in the form of powder, which can be easily separated from the reaction mixture by filtration.

The low temperature solution polycondensation process to be performed in the presence of an organic acid acceptor and an inert organic solvent as in (ii) above, can be practiced in substantially the same manner as polycondensation process (i) using an amide-type solvent. However, in process (ii), simultaneously with the initiation of the polycondensation reaction, a salt of the by-produced hydrogen chloride with the organic acid acceptor starts to precipitate, and normally the copolyamideimine also starts to precipitate before the end of polycondensation reaction.

Also in processes (iii) and (iv), if acetone is used as the reaction solvent, an inorganic, neutral salt may be added to the aqueous solution for adjusting compatibility of acetone with water. As such inorganic neutral salt, alkali metal halides, such as sodium chloride, potassium chloride, lithium chloride, etc. are well suited.

The powdery copolyamideimine obtained by processes (ii), (iii), and (iv) are preferably treated in hot water. The hot water treatment is effective to remove ionic substances existing in the polymer powder as impurities and improve solubility of the copolyamidebenzimidazoles of the invention which are derived from the copolyamideimine by heating, such copolyamidebenzimidazoles being fully described hereinafter.

Through the foregoing processes, generally aromatic copolyamideimines are formed in which structural units of Formula a and those of Formula b are combined at random. Whereas, it is also possible to make block-copolymerized, aromatic polyamideimines in which structural units (a) and (b) are linked as blocks in accordance with the invention, by, for example, utilizing polycondensation process (iv) through the stage of an active intermediate product. For the preparation of such block-copolymer, a suspension or solution of the active intermediate product of the aromatic triamine and benzenedicarboxylic acid dichloride and that of the aromatic diamine and benzenedicarboxylic acid dichloride are separately prepared by process (iv), and the two suspensions or solutions are mixed and the polycondensation is completed by contacting the mixed suspension or aqueous inorganic acid solution with an acceptor.

Also according to the invention, a monofunctional aromatic amine or monofunctional aromatic carboxylic acid chloride may be added to the reaction systems, for adjusting the degree of polymerization.

(I–5) Characteristics of the copolyamideimines

The copolyamideimines of the invention as above-described exhibit improved solubility compared with wholly aromatic polyamides obtained from aromatic diamines such as m-phenylenediamine, and, for example, terephthaloyl chloride and/or isophthaloyl chloride, due to the fact that the former contain the aromatic triamines as a copolymerized component. More specifically, they can be dissolved more easily in solvents such as N-methylpyrrolidone, N,N-dimethylacetamide and dimethylformamide without the aid of additives such as inorganic salts, thus forming stable solutions. From such solutions, shaped articles such as transparent film, etc., can be formed by a dry or wet process.

Also the aromatic copolyamideimines of the invention exhibit substantially equal level of solubility in, for example, amide-type solvents, when compared with aromatic polyamideimines obtained from aromatic triamines and benzenedicarboxylic acid dichlorides, with omission of copolymerization of the aromatic diamine. They are further characterized by the heat stability not appreciably inferior to that of the latter, and improved mechanical properties such as tear strength and bending endurance. Consequently, the aromatic copolyamideimines of the invention can be easily formed into wide varieties of shaped articles such as electrically insulating varnish, enamel, insulating film, as well as ordinary films, coatings, fibers, containers, and other various fabricated materials, etc.

Furthermore, according to the present invention, aromatic copolyamideimines which show excellent solubility in such solvents as, for example, N-methylpyrrolidone, N,N-dimethylacetamide, dimethylsulfoxide, etc., and give aromatic copolyamidebenzimidazoles of excellent heat stability and mechanical properties through the later-described cyclodehydration reaction, are provided, by reacting at least one benzenedicarboxylic acid dichloride selected from the group consisting of terephthaloyl chloride and isophthaloyl chloride with 2,4-diaminodiphenylamine and meta-phenylenediamine, using, (1) when the isophthaloyl chloride content of the benzenedicarboxylic acid dichloride ranges from 100–30 mol percent, a mixture of 70–15 mol percent of 2,4-diaminodiphenylamine and 30–85 mol percent of meta-phenylenediamine, and (2) when the terephthaloyl chloride content of the benzenedicarboxylic acid dichloride ranges from 100–30 mol percent, a mixture of 70 mol percent to $$\left[40-\frac{250}{3}\times\frac{\text{isophthaloyl chloride}}{\text{terephthaloyl chloride}+\text{isophthaloyl chloride}}\right]\text{ mol }\%\text{ of}$$

2,4-diaminodiphenylamine the balance meta-phenylenediamine, in an inert organic solvent in the presence of an acid acceptor, at a temperature within the range from −20° C. to 50° C.

The copolyamidebenzimidazoles derived from such copolyamideimines are further characterized by their excellent solubility in solvents. The aromatic copolyamideimines are composed essentially of the aromatic amideimine structural unit of the formula

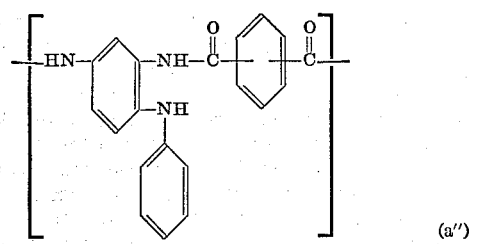

in which

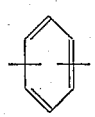

stands for a meta-phenylene group and/or para-phenylene group, and aromatic amide structural units of the formula

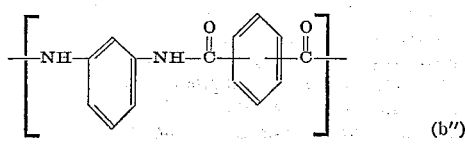

in which

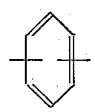

has the same signification as defined with respect to formula a″, and is further characterized in that (1) When the meta-dicarbonylbenzene group content in the dicarbonylbenzene group of the formula

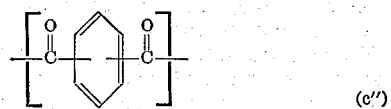

contained in the total structural units expressed by the above Formulae a″ and b″ ranges from 100–30 mol percent, the mol ratio between the aromatic amideimine structural unit expressed by the Formula a″ and the aromatic amide structural unit of Formula b″ ranges 70–15% to 30–85%, the total being always 100%, and (2) When the para-dicarbonylbenzene group content in the dicarbonylbenzene group expressed by the Formula c″ ranges from 100–30 mol percent, 70 mol percent—

$$\left[40-\frac{250}{3}\times\frac{\text{meta-dicarbonylbenzene group}}{\text{total dicarbonylbenzene group}}\right]$$

mol % thereof is formed of the aromatic amideimine structural unit of Formula a″, and the rest is formed of the aromatic amide structural unit of Formula b″.

It is also permissible to copolymerize a fifth component to the extent that it will not impair the characteristics of the above-described aromatic copolyamideimine in accordance with the invention. Again, functional groups such as amino, carboxyl, ester groups, etc. can be bonded at the ends of the copolyamideimine chain, by such methods as shifting the mol ratio of the benzenedicarboxylic acid dichloride component to the amine component (total of aromatic triamine and aromatic diamine) from 1:1 to control the degree of polymerization as well as to provide amine groups or carboxyl groups at the ends of the resulting polymer, or using a monoamine or monocarboxylic acid chloride as a chain-terminating agent having functional groups. Such copolyamideimines can have their molecular weight increased or cross-linked through heating at the time of their shaping, by addition of chain-extending agent or crosslinking agent which reacts with their terminal functional groups.

[II] Aromatic copolyamidebenzimidazoles (II–1) Preparation

The aromatic copolyamideimines composed essentially of the two structural units of the foregoing Formulae a and b of the invention can be converted to film-forming copolyamidebenzimidazoles which are composed essentially of 15–75 mol percent of the structural unit of the formula

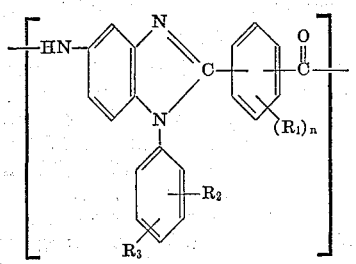

in which the definitions of

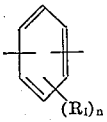

$R_2$ and $R_3$ are as those already given, and 85–25 mol percent of aromatic amide structural unit of the formula

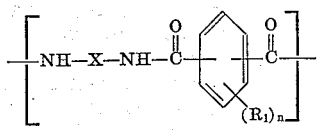

in which the definitions of

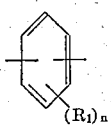

and X are as already given, by heating the copolyamideimine at a temperature not lower than 200° C. but below the decomposition point of the copolyamidebenzimidazole to be formed, or at a temperature not lower than 60° C. but below the decomposition point of the copolyamidebenzimidazole to be formed, when an acidic substance is present in the heating system.

At this time, not all of the aromatic amideimine structural units expressed by the foregoing Formula a or a' need be converted into the cyclized form as shown by the Formula d, depending upon the above-mentioned cyclodehydration conditions, such as the heating temperature, heating time, and/or the amount and kind of the acidic substance. Generally, the intended thermal resistance is sufficiently exhibited if at least 60 mol percent, especially preferably at least 90 mol percent of a total of the aromatic amideimine structural units expressed by Formula a or a' which are contained in the hereinbefore described copolymerized aromatic polyamideimine are converted into the aromatic amidebenzimidazole structural units expressed by Formula d.

The formed aromatic copolyamidebenzimidazole of the invention exhibits still increased heat resistance and chemical stability over the aromatic copolyamideimine, and also excellent mechanical properties.

The conversion of the copolyamideimine of the invention to the corresponding copolyamidebenzimidazole can be generally effected by any known method of converting polyamideimines to polybenzimidazoles, i.e., copolyamideimines are heated to be cyclodehydrated.

Thus, the conversion can be effected by any of the following methods mentioned by way of example:

(i) The copolyamideimines of the invention can be first shaped into such articles as film, fiber, coating, etc., and thereafter converted to the corresponding copolyamidebenzimidazoles.

(ii) Powders of flakes of the copolyamideimine may be directly heated to be converted to copolyamidebenzimidazole. (In that case, the copolyamidebenzimidazole is subsequently shaped.)

(iii) A solvent solution or suspension of the copolyamideimine is heated in the presence of an acidic substance to be converted to copolyamidebenzimidazole. (In that case, the copolyamidebenzimidazole is obtained in the form of a solution or suspension, and may be directly shaped as it is.

Among the conversion methods the conversion by heating alone is advantageous because it is the simplest. That after shaping as in (i) is, the shaped products are heated in air, more preferably in an inert atmosphere such as of nitrogen, argon, etc., or in vacuum, at temperatures ranging from 200° C. to below the decomposition point of the copolyamidebenzimidazole to be formed, preferably 250° C.–350° C., for several tens of minutes to several hours.

Since most of the copolyamideimines in accordance with the invention, particularly those composed of the two structural units of the Formulae a" and b" mentioned in the latter half of the section (I–5), well retain the high solubility in organic solvents even after the conversion to the corresponding copolyamidebenzimidazoles, such solvent-soluble copolyamideimines can be cyclodehydrated as powders or solutions by method (ii) or (iii) to be converted to copolyamidebenzimidazoles, and thereafter formed into shaped articles. In method (ii) above, if the copolyamidebenzimidazole formed by cyclodehydration through heating is again dissolved in a solvent to be shaped, the cyclodehydration by heating is recommendably effected in an inert atmosphere or in vacuum, to avoid the occurrence of an oxidizing reaction, etc. The preferred cyclodehydrating conditions in that case are somewhat variable depending on the polymer composition, degree of polymerization, and the degree of required conversion to the benzimidazole, etc., but normally the cyclodehydration is effected by heating at 250–310° C., for several hours.

Also when the cyclodehydration reaction is accelerated by the concurrent presence of an acidic substance in accordance with the method (iii), as a particularly preferred practice, the starting copolyamideimine is heated and cyclodehydrated in a reaction medium composed of a solvent such as N-methylpyrrolidone, N,N-dimethylacetamide, etc., containing a suitable acidic substance, so that the copolyamidebenzimidazole may be obtained as a homogeneous solution. The acidic substance to be added is not specifically limited as long as it does not induce appreciable side reactions and is soluble in the solvent, but an excessively strong acid is not suitable. Particularly when the product solution is to be directly used for dry shaping, volatile acidic substances are preferred, e.g. carboxylic acids such as formic, acetic, and benzoic acids and the like are employed. Also when the composition of copolyamideimine is such that the copolyamidebenzimidazole derived by cyclodehydration thereof is soluble in an organic, acidic solvent such as formic acid, cresol, etc., the cyclodehydration may be effected in the presence of the acidic solvent, so that the resulting copolyamidebenzimidazole may be obtained in the form of a homogeneous solution in the organic solvent composed chiefly of the acidic solvent.

Again, as a modification of the cyclodehydrating methods in the concurrent presence of an acidic substance as in (iii) above, first a copolyamideimine of the invention may be synthesized in an amide-type solvent such as N-methylpyrrolidone, N,N-dimethylacetamide, etc. by low temperature solution polycondensation, and the system may be further heated as it is to convert the copolyamideimine to copolyamidebenzimidazole, by the catalytic action of the hydrogen chloride by-produced in the first-mentioned copolyamideimine synthesis. The hydrogen chloride remaining in the amide type solvent solution of the resulting copolyamidebenzimidazole can be removed by adding a lower alkylene oxide, such as ethylene oxide or propylene oxide, to the solution to cause the reaction thereof with hydrogen chloride to form a lower alkylene chlorohydrin.

The amide-type solvent solution of copolyamidebenzimidazole which is obtained can be used as a coating or shaping solution as it is. Therefore, according to the above process, the coating or shaping solution of copolyamidebenzimidazole can be easily obtained through a single stage procedure without the need of separating copolyamideimine, with very high industrial advantage.

In the foregoing process (iii) and above modification thereof, the heating temperature and time in the concurrent presence of an acid are variable depending on the acidity and amount of the acid employed, while normally employed conditions range from 60° C. to below the decomposition point of the copolyamidebenzimidazole formed, preferably 80° C.–200° C., for 5 minutes to 5 hours. Unnecessarily severe conditions should be avoided, since such may induce side reactions such as hydrolysis.

The conversion from copolyamideimine to copolyamidebenzimidazole can be detected by means of the infrared absorption spectrum. That is, the conversion can be confirmed by the decrease in characteristic absorption due to the amide group and increase in characteristic absorption due to the N-aryl-substituted benzimidazole.

(II–2) Characteristics of the copolyamidebenzimidazole

The copolyamidebenzimidazoles of the invention generally possess softening points of not lower than 300° C., decomposition points of not lower than 400° C., and inherent viscosities of at least 0.1, normally not less than 0.3, when measured as to 0.5 g./100 ml. polymer concentration solution in dimethylformamide or N-methylpyrrolidone. They can withstand continuous use for many hours at temperatures as high as 200° C.–250° C. The copolyamidebenzimidazoles exhibit excellent heat resistance, mechanical properties, and electrical characteristics, and are adapted for wide varieties of usages as shaped articles such as coating, film, fiber, container, and other various fabricated materials. In practice, they can be mixed with other resins, or added with minor amount of stabilizers, modifiers, etc.

Most of the copolyamidebenzimidazoles of the invention, particularly the copolyamidebenzimidazoles derived from the copolyamideimines composed essentially of the two structural units of the foregoing Formulae a″ and b″, are soluble in various solvents such as N-methylpyrrolidone, N,N-dimethylacetamide, hexamethylphosphoramide, dimethylsulfoxide, etc. as already mentioned. Furthermore, some of the copolyamidebenzimidazoles are soluble also in dimethylformamide m-cresol, formic acid, etc., and can be shaped after cyclodehydration.

The copolyamidebenzimidazoles of the invention generally exhibit higher softening points than those of the polyamides obtained at the same mol ratios of terephthalic acid component and/or isophthalic acid component to those employed for the preparation of the starting copolyamideimines but not containing aromatic triamine as a copolymerizing component, i.e., the polyamides composed of the recurring structural unit (b) or (b″) alone. Again the copolyamidebenzimidazoles of the invention generally exhibit equal level of heat resistance, better mechanical properties, and economical advantages, compared with the polyamidebenzimidazoles obtained from the aromatic triamine, terephthaloyl chloride and/or isophthaloyl chloride but not containing the aromatic diamine as a copolymerizing component. Furthermore, they generally have high breakdown voltage, volume resistivity, etc. and consequently have wide utilities as the various shaped articles required of heat resistance and excellent mechanical properties as already mentioned, such as insulating varnish, enamel, insulating film, etc.

Hereinafter the invention will be described in fuller details with reference to working examples, which are given strictly for the purpose of illustration, not in any sense limiting the scope of the invention.

Unless otherwise specified, dimethylformamide was used as the organic solvent in measuring the inherent viscosity. Also the thermogravimetric analysis was performed at a temperature rising rate of 5° C./min. in air.

EXAMPLE 1

A solution composed of 3.98 g. (0.02 mol) of 2,4-diaminodiphenylamine, 2.16 g. (0.02 mol) of m-phenylenediamine, and 80 ml. of methyl ethyl ketone was prepared, to which another solution composed of 2.03 g. (0.01 mol) of terephthaloyl chloride, 6.09 g. (0.03 mol) of isophthaloyl chloride, and 40 ml. of methyl ethyl ketone was added with stirring. The stirring was continued for an additional 20–30 seconds, to form a homogeneous, slurry-like solution. This emulsified dispersion of the active intermediate product was thrown into a separately prepared aqueous solution composed of 8.48 g. (0.08 mol) of sodium carbonate and 120 ml. of water, with high speed stirring in a blender, followed by an additional 6 minutes' stirring to complete the polymerization. The polymer was precipitated as finely divided particles in the reaction mixture, which were separated from the latter by centifugal filtration, and re-dispersed in 500 ml. of water, followed by boiling the aqueous dispersion for 2 hours. The polymer was again isolated by filtration. A yellowish white, finely divided polymer was obtained substantially quantitatively. The polymer was soluble in N-methylpyrrolidone and dimethylformamide at high concentrations, and had an inherent viscosity of 0.65.

This polymer (copolyamideimine) was heat-treated at 260° C. for 3 hours in nitrogen current. No appreciable difference in appearance was observed except that the color was somewhat lightened, but on the infrared absorption spectrum, absorptions characteristic to N-phenyl-substituted benzimidazole appeared at 1380 cm.$^{-1}$, 1350 cm.$^{-1}$, and 770 cm.$^{-1}$, indicating that the copolyamideimine was converted to the copolyamidebenzimidazole. After the conversion, the copolyamidebenzimidazole showed an inherent viscosity of 0.85, and became soluble in cresol at a concentration of at least 15 wt. percent and in the amide-type solvents. A 25 wt. percent N-methylpyrrolidone solution of this copolyamidebenzimidazole was prepared and spread on a glass plate, which was dried for a day in air at 160° C., and for 5 hours under a reduced pressure at 160° C. to be formed into a film. When the formed film of 30µ in thickness was measured for its breaking tenacity and elongation, the results were 1,120 kg./cm.$^2$ and 5.9%. The film was also subjected to a aging test by heating at 300° C. for 20 hours in air, but retained a substantially unchanged appearance, and a breaking tenacity and elongation of, respectively, 1,150 kg./cm.$^2$ and 6.2%, thus showing excellent heat resistance. According to the results of thermogravimetric analysis, the film showed substantially no weight decrease up to the temperatures in the vicinity of 410° C., exhibiting good thermal stability.

EXAMPLE 2

Similarly to Example 1, by the method going through the stage of an active intermediate product using methyl ethyl ketone as the reaction solvent, an amine mixture composed of 45 mol percent of 2,4 - diaminodiphenylamine and 55 mol percent of m-phenylenediamine and terephthaloyl chloride were polycondensed, producing a copolyamideimine having an inherent viscosity of 0.86.

The copolyamideimine was soluble in N-methylpyrrolidone to a polymer concentration of at least 15 wt. percent, forming a stable solution. Thermal cyclodehydration of this copolyamideimine was effected under the same conditions as employed in Example 1, to cause its conversion to copolyamidebenzimidazole which had an inherent viscosity of 0.95.

This copolyamidebenzimidazole retained the solubility in N-methylpyrrolidone. Its 20 wt. percent concentration solution in N-methylpyrrolidone was formed into a sheet of film of 25µ in thickness under the same drying conditions as employed in Example 1, film having a breaking tenacity and elongation of, respectively, 1,110 kg./cm.$^2$ and 4.9%. The film was subjected to an aging test of 20 hours' heating at 300° C. in air, but retained a substantially unchanged appearance, and breaking tenacity and elongation of 1,060 kg./cm.$^2$ and 4.9%, thus exhibiting good heat resistance.

EXAMPLE 3

Under similar conditions to those employed in Example 1, an amine mixture composed of 25 mol percent of 2,4-diaminodiphenylamine and 75 mol percent of m-phenylenediamine and an acid chloride mixture composed of 50 mol percent of terephthaloyl chloride and 50 mol percent of isophthaloyl chloride were polycondensed, producing a copolyamideimine having an inherent viscosity of 0.46. The copolyamideimine was soluble in N-methylpyrrolidone and dimethylformamide at the polymer concentration of at least 15 wt. percent, providing stable solutions. Thermal cyclodehydration of this copolyamideimine was effected under the same conditions as employed in Example 1, to convert it to copolyamidebenzimidazole, which had an inherent viscosity of 0.49 and retained the solubility in N-methylpyrrolidone. Under the same conditions as employed in Example 1, a film sheet of 29μ in thickness was prepared therefrom, which showed a breaking tenacity and elongation of 1,200 kg./cm.$^2$ and 4.9%. The film was heated at 300° C. for 20 hours in air, but showed substantially no external change except that the color was slightly browned, and retained the breaking tenacity and elongation of 1,230 kg./cm.$^2$ and 7%, exhibiting high heat resistance.

By comparison, a polyamide having an inherent viscosity of 0.51 was prepared from an acid chloride mixture composed of 50 mol percent of terephthaloyl chloride and 50 mol percent of isophthaloyl chloride, and m-phenylenediamine, by the method via the stage of an active intermediate product similarly to Example 1. The polyamide was formed into a sheet of film through similar procedures, but the film was so brittle that even a dumbbell form could not be stamped out therefrom.

Thereafter, another polyamide of similar main chain structure having an intrinsic viscosity of 1.2 was synthesized and similarly formed into a sheet of film. The film had a breaking tenacity of 840 kg./cm.$^2$, but when heated at 300° C. for 20 hours in air, it shrank conspicuously, and partly adhered.

EXAMPLE 4

In a 100-ml. capacity, three neck flask equipped with a seal-attached stirrer and calcium chloride tube, 1.19 g. (0.006 mol) of 2,4-diaminodiphenylamine and 2.59 g. (0.024 mol) of m-phenylenediamine were dissolved in 50 ml. of N-methylpyrrolidone. The solution was cooled with ice from outside, and into which 3.09 g. (0.03 mol) of isophthaloyl chloride were added under stirring. The cooling with ice was contained until the heat generated during the initial stage of reaction was extinguished, and the reaction was continued at room temperature. After 5 hours' continuous reaction, the reaction mixture was thrown into water to separate the resulting copolyamideimine which had an inherent viscosity of 0.51. The product was soluble in N-methylpyrrolidone at the concentration of at least 15 wt. percent. When it was converted to the corresponding copolyamidebenzimidazole by thermal cyclodehydration under the same conditions as employed in Example 1, the product had an inherent viscosity of 0.55. The film prepared from a N-methylpyrrolidone solution of this copolyamidebenzimidazole under the same conditions as employed in Example 1 had a breaking tenacity and elongation of 1,130 kg./cm.$^2$ and 5%.

EXAMPLE 5

In a 200-ml. capacity, three-necked flask provided with a sealable stirrer and calcium chloride tube, 3.24 g. (0.03 mol) of meta-phenylenediamine and 1.99 g. (0.01 mol) of 2,4-diaminodiphenylamine were dissolved in 65 ml. of dried N,N'-dimethylacetamide. The solution was cooled with ice water, and into which the mixture of 2.03 g. (0.01 mol) of powdery terephthaloyl chloride and 6.09 g. (0.03 mol) of isophthaloyl chloride were added all at once under stirring. Thirty minutes thereafter, the ice water was removed, and stirring was continued for further 90 minutes at room temperature to complete polymerization. The obtained polymer solution was brown in color and not transparent, due to the precipitation of N,N'-dimethylacetamide hydrochloride. A portion of the solution was poured in water, and the formed copolyamideimine was separated, which had an inherent viscosity of 0.61. To the remaining non-transparent polymer solution, 2.32 g. (0.04 mol) of propylene oxide were added at room temperature, followed by 30 minutes' stirring, where-upon the solution became brown and transparent. The same solution was heated at 110° C. for 60 minutes in an oil bath, to cause cyclodehydration of the copolyamideimine. After cooling the system, further 9.28 g. (0.16 mol) of propylene oxide were added for recovering all the residual hydrochloric acid in the form of propylene chlorohydrin. Thereafter the solution was heated to 160–170° C. in nitrogen current, to effect distillation of excessive propylene oxide and propylene chlorohydrin formed.

The resulting polymer solution was light brown in color and transparent, which had an inherent viscosity of 0.72. The film formed by spreading the solution on a sheet glass was substantially colorless, transparent and tough. Also according to its infrared absorption spectrum, absorptions characteristic of the benzimidazole ring appeared at 1380 cm.$^{-1}$, 1360 cm.$^{-1}$, and 770 cm.$^{-1}$, clearly indicating that the cyclodehydration had been substantially complete.

When the resulting polymer was reprecipitated in water and into that aqueous solution aqueous silver nitrate was added under the acidic condition created by addition of nitric acid, practically no turbidity was observed. Furthermore, when the reprecipitated polymer was dried, dissolved in dimethylformamide and titrated with alkali, the titration curve drew only one peak due to the end carboxylic acid group of the polymer. From those facts, it was confirmed that the hydrochloric acid by-produced during the polymerization was converted to propylene chlorohydrin as reacted with propylene oxide.

EXAMPLE 6

In 600 ml. of dried tetrahydrofuran, 20.3 g. (0.1 mol) of terephthaloyl chloride and 60.9 g. (0.3 mol) of isophthaloyl chloride were dissolved. Separately, 19.9 g. (0.1 mol) of 2,4-diaminodiphenylamine and 32.4 g. (0.3 mol) of meta-phenylenediamine were similarly dissolved in 600 ml. of dry tetrahydrofuran.

The acid chloride solution was cooled with ice, to which the amine solution was added with stirring, consuming approximately 20 minutes, while care being of the maintain the solution temperature below 15° C. Thus an opaque solution of an active intermediate product was prepared. The solution was thrown into 1,200 ml. of an aqueous solution containing 84.8 g. of sodium carbonate with vigorous stirring, followed by 5 minutes' additional agitation to complete polymerization. The polymer solution was diluted with three times its amount of water (3,600 ml.), centrifugally filtered, and treated with boiling water for 2 hours. The obtained polymer was in the form of yellowish brown, finely divided particles. The yield was 112 g. which was substantially quantitative. The inherent viscosity thereof was 0.94.

The finely divided particles were heated at 260–270° C. for 2 hours in nitrogen current to cause cyclodehydration. According to the infrared absorption spectrum, appearance of absorptions characteristic of copolybenzimidazole, i.e. those at 1380 cm.$^{-1}$, 1360 cm.$^{-1}$, and 770 cm.$^{-1}$, were observed, indicating that the cyclodehydration had almost completely advanced. The inherent viscosity of the polymer after cyclodehydration was 1.06.

This polymer powder was dissolved in N-methylpyrrolidone to a concentration of 15 wt. percent, and the solution was spread onto a glass plate to form a film of 42μ in thickness. The film was dried at 150° C. for 5 hours, and thereafter heated at 250° C. for 30 minutes. The tenacity and elongation of the film at room temperature were, respectively, 1,230 kg./cm.$^2$ and 13.6%, which changed to 1,190 kg./cm.$^2$ and 8.0% after 40 hours' heating at 300° C. in air, indicating high thermal stability of the film. Also the shrinkage through the test was 3.3%. The film showed a tear strength as measured by Elemendorf's method at room temperature of 290 g./mm. Also as the electrical characteristics, its breakdown voltage at room temperature was 150 kv./mm., and volume resistivity at room temperature was $1.5 \times 10^{15} \Omega \cdot cm.$, and $4 \times 10^{12} \Omega \cdot cm.$ at 200° C.

For comparison, separately a polyamidebenzimidazole composed of 25 mol percent of terephthaloyl chloride, 75 mol percent of isophthaloyl chloride, and 100 mol percent of 2,4-diaminodiphenylamine was synthesized, which was similarly formed into a film. The control film had a tear strength as measured by Elemendorf's method of as low as 85 g./mm.

Furthermore, another film was prepared from a copolymer composed 25 mol percent of terephthaloyl chloride, 75 mol percent of isophthaloyl chloride, and 100 mol percent of meta-phenylenediamine, and allowed to stand at 300° C. for 40 hours. The film showed a shrinkage of 9%.

From the foregoing comparative data, it is apparent that the film of the composition specified in this invention possesses high dimensional stability at high temperatures as well as high tear strength at room temperature.

EXAMPLE 7

Into a solution formed of 630 ml. of dried tetrahydrofuran and 126.4 g. of isophthaloyl chloride, another solution formed of 630 ml. of dried tetrahydrofuran and 67.3 g. of meta-phenylenediamine was added with stirring and cooling with ice, to prepare an active intermediate product solution (I).

Separately, into a solution formed of 130 ml. of dried tetrahydrofuran and 25.9 g. of isophthaloyl chloride, another solution formed of 130 ml. of dried tetrahydrofuran and 25.4 g. of 2,4-diaminodiphenylamine was added with stirring and cooling with ice, to prepare a solution of an active intermediate product (II).

Solutions (I) and (II) were mixed, and added into 1500 ml. of an aqueous solution in which 95.4 g. of sodium carbonate was dissolved, with vigorous stirring. After 3 minutes' additional stirring, a yellowish white, fine powdery polymer was obtained, which had an inherent viscosity of 2.21. This polymer powder was heated at 260-270° C. for 3 hours in nitrogen current, to cause cyclodehydration thereof. After the cyclodehydration, the polymer had an inherent viscosity of 2.55.

This polymer powder was dissolved in N,N'-dimethylacetamide to a concentration of 18 wt. percent, which showed no change after 5 days' standing at 100° C. Thus the solution was extremely stable. The solution was dry spun through a cap having holes 0.3 mm. in diameter at a rate of 30 m./min. The temperature of the oven through which the spun fibers were passed was 200° C. The as-spun fibers were heat-drawn by 3.1 times and passed onto a heated plate of 290° C. The resulting drawn fibers exhibited the following properties at room temperature: strength, 3.65 g./de.; elongation, 12.5%; initial Young's modulus, 76 g./de.; and residual solvent, 1.85%.

For comparison, powder of a polymer having an inherent viscosity of 1.91 obtained from isophthaloyl chloride and meta-phenylenediamine through similar procedures as above was dissolved in N,N'-dimethylacetamide in an attempt to make an 18 wt. percent solution, but without addition of an inorganic salt such as lithium chloride, a stable solution usable as a dry spinning solution could not be prepared.

EXAMPLE 8

In one liter of dried tetrahydrofuran, 131.95 g. (0.65 mol) of terephthaloyl chloride and 76.3 g. (0.35 mol) of methylterephthalic acid chloride were dissolved, and to the resulting solution a separately prepared solution of one liter of tetrahydrofuran containing 64.8 g. (0.6 mol) of meta-phenylenediamine and 79.6 g. (0.4 mol) of 2,4-diaminodiphenylamine were gradually added to form an opaque emulsion. The emulsion was then contacted with 2 liters of an aqueous solution containing 212 g. of anhydrous sodium carbonate as dissolved therein under vigorous stirring, followed by 3 minutes' reaction. Whereupon formed yellowish white polymer was filtered off, washed and dried. The polymer was obtained substantially quantitatively, which had an inherent viscosity of 0.87. This polymer was soluble in dimethylformamide and dimethylacetamide to the concentration of each 20 wt. percent, and in N-methylpyrrolidone and the like, to 35 wt. percent. From those solutions, tough, light yellow, and transparent films were obtained.

When the films were treated at 300° C. for 2 hours in nitrogen current, their appearances changed little except that their color was slightly lightened. On their infrared absorption spectra, however, characteristic absorptions of benzimidazole were present, indicating that the polymers were converted to copolyamidebenzimidazoles.

A powdery polymer obtained from 13.20 g. (0.065 mol) of terephthaloyl chloride, 7.63 g. (0.035 mol) of methylterephthalic acid chloride, and 10.8 g. (0.1 mol) of meta-phenylenediamine through identical procedures as above had an inherent viscosity of 0.72, this polymer could not provide a high concentration solution in N-methylpyrrolidone such as above 20 wt. percent and solutions at concentrations below 20 wt. percent were rather unstable.

EXAMPLE 9

11.69 grams (0.05 mol) of 2,4 - diamino - 4' - chlorodiphenylamine and 5.4 g. (0.05 mol) of meta-phenylenediamine were dissolved in 350 ml. of methyl ethyl ketone. The solution was put into a blender together with 500 ml. of an aqueous solution containing 21.2 g. of anhydrous sodium carbonate, and stirred violently. Into the system with stirring, then 150 ml. of methyl ethyl ketone solution of 20.3 g. (0.1 mol) of terephthaloyl chloride were thrown, followed by additional 5 minutes' stirring. Thus a polymer having an inherent viscosity of 1.21 was obtained in the form of a yellowish green powder, which was easily soluble in N-methylpyrrolidone, N,N'-dimethylacetamide, dimethylformamide, hexamethylphosphoramide, etc. From an N-methylpyrrolidone solution thereof, yellow, transparent and tough film was obtained. When the film was heated at 280-290° C. for 2 hours in nitrogen current to cause cyclodehydration, no change in appearance took place except that its color faded close to a colorless state, indicating its high heat stability. Conversion to copolyamidebenzimidazole was confirmed through its infrared absorption spectrum.

EXAMPLE 10

4.975 grams (0.025 mol) of 2,4-diaminodiphenylamine and 14.85 g. (0.075 mol) of 4,4'-diaminodiphenylmethane were dissolved in 160 ml. of methyl ethyl ketone. The solution was put into a blender together with 240 ml. of an aqueous solution containing 21.2 g. of anhydrous sodium carbonate, and stirred vigorously. Into the system then, 80 ml. of a methyl ethyl ketone solution of 5.075 g. (0.025 mol) of terephthaloyl chloride and 15.225 g. (0.075 mol) of isophthaloyl chloride were thrown, followed by further 5 minutes' stirring. The obtained powder was yellowish white in color, and had an inherent viscosity of 0.76. This powdery polymer was soluble in N-methylpyrrolidone up to a concentration of 30 wt. percent. When the powder was thermally cyclodehydrated at 280–290° C. for 2 hours in nitrogen current, it showed an inherent viscosity of 0.78, and was soluble in dimethylformamide and N,N'-dimethylacetamide each to a concentration of 10 wt. percent, and in N-methylpyrrolidone, to 20 wt. percent. From those solutions, light yellow, transparent, tough films were obtained.

A polymer obtained from 5.075 g. (0.025 mol) of terephthaloyl chloride, 15.225 g. (0.075 mol) of isophthaloyl chloride, and 19.8 g. (0.1 mol) of 4,4'-diaminodiphenylmethane, through entirely identical procedures with the foregoing had an inherent viscosity of 0.60, but exhited poor solubility. For example, when it was dissolved in N-methylpyrrolidone, a homogeneous, transparent solution could not be obtained at concentrations higher than 10 wt. percent. The polymer was swellable with dimethylformamide and N,N'-dimethylacetamide, but insoluble in such solvents.

EXAMPLE 11

9.95 grams (0.05 mol) of 2,4-diaminodiphenylamine and 10.0 g. (0.05 mol) of 4,4'-diaminodiphenylether were dissolved in 830 ml. of methyl ethyl ketone. The solution was put in a blender together with 570 ml. of an aqueous solution containing 21.2 g. of anhydrous sodium carbonate dissolved therein, and stirred vigorously. Into that system then 190 ml. of methyl ethyl ketone solution containing 5.075 g. (0.025 mol) of terephthaloyl chloride and 15.225 g. (0.075 mol) of isophthaloyl chloride were thrown, followed by 5 minutes' additional stirring. The obtained polymer was yellowish white in color, and had an inherent viscosity of 0.82. This polymer was easily soluble in dimethylformamide to a concentration of 20 wt. percent, and in N-methylpyrrolidone, to 35 wt. percent. When the polymer was cyclodehydrated by heating at 280–290° C. for 2 hours in nitrogen current, its inherent viscosity rose to 0.91. Also the product was soluble in dimethylformamide to a concentration of 15 wt. percent, and in N-methylpyrrolidone, up to 25 wt. percent. The solutions formed light yellow, transparent and tough films.

The film of 35μ in thickness which was formed from the 20 wt. percent N-methylpyrrolidone solution had a tenacity and elongation at room temperature of, respectively, 920 kg./cm.$^2$ and 16.7%. When the film was left standing in air at 300° C. for 20 hours free of tension, its tenacity and elongation changed to 900 kg./cm.$^2$ and 7.1%.

Whereas, when 5.075 g. of terephthaloyl chloride, 15.225 g. of isophthaloyl chloride, and 20.0 g. of 4,4'-diaminodiphenylether were used in the polymerization performed in the manner identical with above, a white powder of 0.63 in inherent viscosity was obtained. The polymer was soluble in N-methylpyrrolidone to a concentration of 15 wt. percent, but was difficultly soluble in dimethylformamide. In order to obtain 10 wt. percent solution of the polymer in the latter solvent, lithium chloride had to be added.

EXAMPLE 12

1.99 grams (0.01 mol) of 2,4-diaminodiphenylamine and 7.44 g. (0.03 mol) of 3,3'-diaminodiphenylsulfone were dissolved in 80 ml. of methyl ethyl ketone, and the solution was put into a home blender together with an aqueous solution formed by dissolving 8.48 g. (0.08 mol) of anhydrous sodium carbonate in 120 ml. of water. While the system was vigorously stirred, a solution formed by dissolving 4.06 g. (0.02 mol) of terephthaloyl chloride and 4.06 g. (0.02 mol) of isophthaloyl chloride in 40 ml. of methyl ethyl ketone was thrown thereinto, followed by 5 minutes' additional stirring. The obtained polymer powder was yellowish white in color, and had an inherent viscosity of 0.63. The polymer was very easily soluble in N-methylpyrrolidone, N,N'-dimethylacetamide, dimethyl-formamide, etc. When the powdery polymer was heated at 270–280° C. for 3 hours in nitrogen current to cause thermal cyclodehydration thereof, its inherent viscosity rose to 0.76, and the product was easily soluble in N-methylpyrrolidone, dimethylformamide, N,N'-dimethylacetamide, and also in m-cresol, formic acid, etc. Its 20 wt. percent solution in N-methylpyrrolidone was shaped into light yellow, transparent, tough film. After 20 hours' standing in the air of 300° C., the film showed a shrinkage of approximately 7% and slightly deepened color tone, but retained satisfactory flexibility.

The polymer powder after the thermal cyclodehydration was dissolved in meta-cresol, to a concentration of 20 wt. percent. The solution was daubed onto a copper plate, and dried at 300° C. for 10 minutes. A light brown coating of good adherability was obtained, which did not peel off when bent. Similarly high quality coating was obtained also when the solution was applied and baked on an aluminum sheet. Furthermore, the solution was applied several times to a strand of copper wire of 1.0 mm. in diameter, to a thickness of approximately 30μ, each application being followed by 30 seconds' baking at 250° C. When coated copper wire was coiled, no peeling off or cracking of the coating was observed. Also when the above coated wire of 20 cm. in length was twisted, the coating was peeled off at the 75th twisting.

Whereas, the polymer obtained by entirely identical procedures as above from 4.06 g. (0.02 mol.) of terephthaloyl chloride, 4.06 g. (0.02 mol) of isophthaloyl chloride, and 9.92 g. (0.04 mol) of 3,3'-diaminodiphenylsulfone had an inherent viscosity of 0.61. The polymer was well soluble in N-methylpyrrolidone, N,N'-dimethylacetamide, and dimethylformamide, but difficultly soluble in meta-cresol, and could not be formed into a stable solution useful as shaping solution.

EXAMPLES 13–17

Through the polymerization procedures identical with those of Example 12, polymers were formed using various aromatic diamines. Results of each copolymerization run were given in the table below. Thermal cyclodehydration of the copolymers were in all runs performed at 280° C. for 3 hours in nitrogen current.

Thus obtained copolyamidebenzimidazoles were not softened at temperatures below 300° C., when observed on heated plate.

| Example Number | Acid chloride | | Amine | | | Properties after cyclodehydration | |
|---|---|---|---|---|---|---|---|
| | Terephthaloyl chloride (mol) | Isophthaloyl chloride (mol) | Diamine (mol) | 2,4-diaminodiphenylamine (mol) | η inh.* | η inh.* | Solubility |
| 13 | 0.05 | 0.05 | 4,4'-diminodiphenyl sulfide (0.06) | 0.04 | 0.85 | 0.97 | Soluble in N-methylpyrrolidone to at least 10 wt. percent. |
| 14 | 0.03 | 0.07 | 3,3'-dimethyl benzidine (0.07) | 0.03 | 0.91 | 0.95 | Soluble in N-methylpyrrolidone to at least 25 wt. percent. |
| 15 | 0.025 | 0.075 | p-Phenylenediamine (0.07) | 0.03 | 1.02 | 1.15 | Soluble in N-methylpyrrolidone to at least 20 wt. percent. |
| 16 | 0.025 | 0.075 | 1,5-diaminonaphthalene (0.06) | 0.04 | 1.06 | 1.21 | Do. |
| 17 | 0.03 | 0.07 | 4,4'-diaminodiphenylketon (0.06) | 0.04 | 0.82 | 0.95 | Soluble in N-methylpyrrolidone to at least 25 wt. percent. |

*Measured at 30° C. at the concentration of dissolving 0.5 g. of the polymer in 100 ml. of N-methylpyrrolidone.

We claim:
1. A film-forming, aromatic copolyamideimine, consisting essentially of 15–70 mol percent of aromatic amideimine structural units of the formula

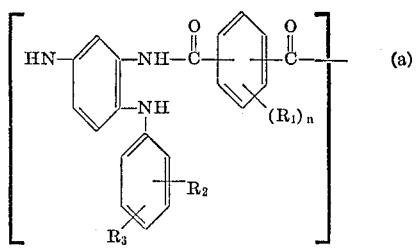

wherein each

represents a meta-phenylene group or para-phenylene group,
$R_1$ represents a methyl group or halogen atom,
$n$ is 0, 1, or 2, $(R_1)_n$ representing a hydrogen atom when $n$ equals zero,
$R_2$ and $R_3$ may be same or different, and each represents a hydrogen atom or a non-reactive atomic group, and 85–30 mol percent of aromatic amide structural units of the formula
wherein

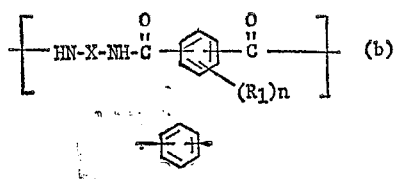

$R_1$, and $n$ have the same meanings as in Formula a, and X is at least one atomic group selected from the group consisting of a phenylene group, biphenylene group, naphthylene group and divalent atomic group of the formula

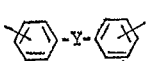

wherein —Y— is a member selected from the group consisting of alkylene groups of 1–3 carbons, —O—, —S—, —SO$_2$—, and

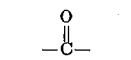

wherein 1–2 hydrogen atoms linked with the nuclear carbon or carbons of the aromatic rings may be substituted with halogen, methyl or methoxy groups.

2. The aromatic copolyamideimine of claim 1, consisting essentially of 15–70 mole percent of aromatic amideimine structural units of the formula,

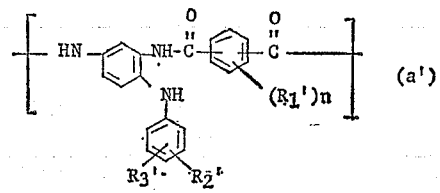

wherein each

represents a meta-phenylene group or para-phenylene group,
$R_1'$ represents a methyl group or chlorine atom,
$n$ is 0, 1, or 2, $(R_1')_n$ representing a hydrogen atom when $n$ equals zero, and
$R_2'$ and $R_3'$ may be same or different, and each represents a hydrogen atom, chlorine atom, bromine atom, methyl group, methoxy group, or phenoxy group, and 85–30 mol percent of aromatic amide structural units of the formula,

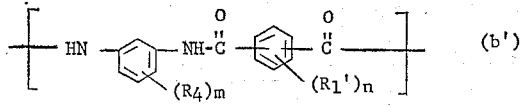

wherein

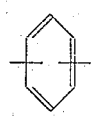

$R_1'$ and $n$ have the same meaning as in Formula a'
$R_4$ represents a chlorine atom or methyl group, and
$m$ is 0, 1 or 2, $(R_4)_m$ representing a hydrogen atom when $m$ equals zero.

3. A film-forming, aromatic copolyamideimine consisting essentially of aromatic amideimine structural units of the formula,

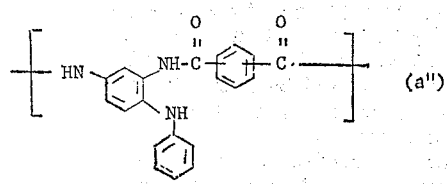

wherein each

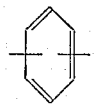

represents a meta-phenylene group or para-phenylene group and aromatic amide structural units of the formula

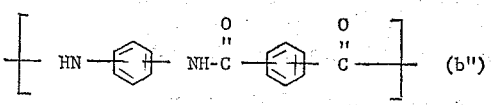

wherein

has the same meaning as in Formula a", said copolyamideimine being further characterized in that
(1) when the meta-dicarbonylbenzene group content in the dicarbonylbenzene group of the formula

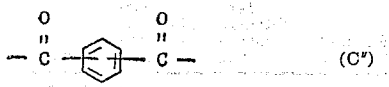

contained in the total structural units of Formulae a" and b" is within the range of 100–30 mol percent, the mol ratio between said aromatic amideimine structural units of Formula a" and said aromatic amide structural units of Formula b" is within the range of 70–15% to 30–85%, the total being invariably 100%, and (2) when the para-dicarbonylbenzene group content of the dicarbonylbenzene group of Formula c″ is within the range of 100–30 mol percent, 70 mol percent–

$$\left[40 - \frac{250}{3} \times \frac{\text{meta-dicarbonylbenzene group}}{\text{total dicarbonylbenzene group}}\right]$$

mol percent of the copolyamideimine is composed of said aromatic amideimine structural units of Formula a″, the balance being said aromatic amide structural units of Formula b″.

4. A film-forming copolyamidebenzimidazole consisting essentially of 15–70 mol percent of aromatic amide-benzimidazole structural units of the formula,

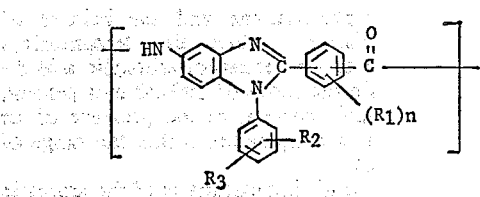

wherein each

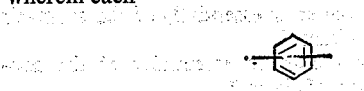

represents a meta-phenylene group or para-phenylene group,
$R_1$ represents a methyl group or halogen atom,
$n$ is 0, 1, or 2, $(R_1)_n$ representing a hydrogen atom when $n$ equals zero,
$R_2$ and $R_3$ may be same or different, and each represents a hydrogen atom or a non-reactive atomic group,
and 85–30 mol percent of aromatic amide structural units of the formula

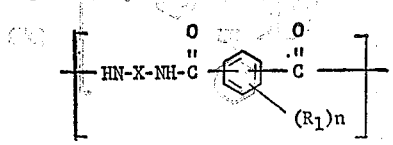

wherein

$R_1$, and $n$ have the same meanings as in Formula a, and X is at least one atomic group selected from the group consisting of phenylene group, biphenylene group, naphthylene group and divalent atomic group of the formula

wherein —Y— is a member selected from the group consisting of alkylene groups of 1–3 carbons, —O—, —S—, —SO$_2$—, and

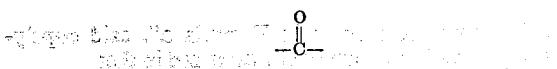

wherein 1–2 hydrogen atoms linked with the nuclear carbon or carbons of the aromatic rings may be substituted with halogen, methyl or methoxy groups.

5. A process for the preparation of film-forming aromatic copolyamideimines which comprises reacting
(A) at east one aromatic triamine of the formula

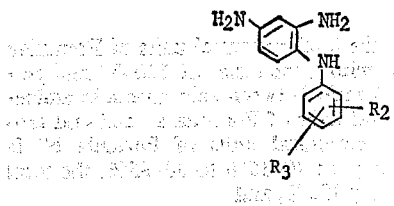

wherein $R_2$ and $R_3$ are the same or different and each represents a hydrogen atom or a non-reactive atomic group, and
(B) at least one aromatic diamine of the formula
$$H_2N\text{---}X\text{---}NH_2$$
wherein X is at least one atomic group selected from the group consisting of a phenylene group, biphenylene group, naphthylene group and the atomic group of the formula

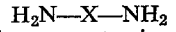

wherein —Y— is a member of the group consisting of alkylene groups of 1–3 carbons, —O—, —S—, —SO$_2$—, and

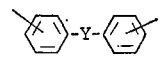

wherein 1–2 hydrogen atoms linked with the nuclear carbon atom or atoms of the aromatic rings may be substituted with a halogen atom, methyl group or methoxy group,
at a ratio of 15–70 mol percent of said aromatic triamine (A) to 85–30 mol percent of said aromatic diamine (B), the total being 100 mol percent, with
(C) at least one dichloride of a benzenedicarboxylic acid of the formula

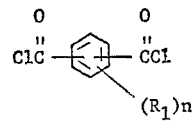

wherein

represents a meta-phenylene group or para-phenylene group,
$R_1$ represents a methyl group or halogen atom, and $n$ is an integer of 0–2, $(R_1)_n$ representing a hydrogen atom when $n$ equals zero,
in an inert organic solvent in the presence of an acid acceptor, at a temperature within the range of —20° C.– 50° C.

6. A process for the preparation of film-forming, copolyamidebenzimidazole consisting essentially of 15–70 mol percent of structural units of the formula

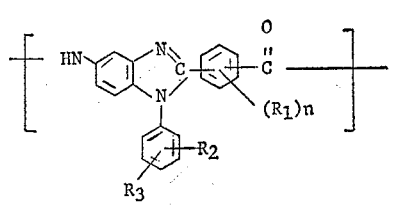

wherein each

represents a meta-phenylene group or para-phenylene group,
$R_1$ represents a methyl group or halogen atom,
$n$ is 0, 1, or 2, $(R_1)_n$ representing a hydrogen atom when $n$ equals zero, R₂ and R₃ may be same or different, and each represents a hydrogen atom or a non-reactive atomic group, and 85–30 mol percent of aromatic amide structural units of the formula

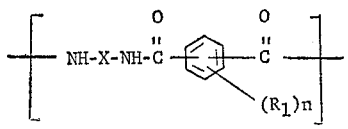

wherein

R₁, and n have the same meanings as defined above,
X is at least one atomic group selected from the group consisting of a phenylene group, biphenylene group, naphthylene group and divalent atomic group of the formula

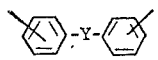

wherein —Y— is a member selected from the group consisting of alkylene groups of 1–3 carbons, —O—, —S—, —SO₂—, and

wherein 1–2 hydrogen atoms linked with the nuclear carbon or carbons of the aromatic rings may be substituted with halogen, methyl or methoxy groups, which comprises heating a film-forming, aromatic copolyamideimine consisting essentially of 15–70 mol percent of aromatic amideimine structural units of the formula

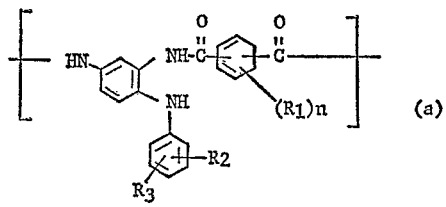

wherein

R₁, n, R₂ and R₃ are as defined above and 85–30 mole percent of aromatic amide structural units of the formula

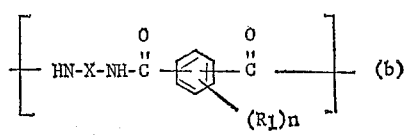

wherein

R₁, n, and X are as defined above at a temperature not lower than 200° C. but below the decomposition point of the copolyamidebenzimidazole to be formed, or at a temperature of not lower than 60° C. but below the decomposition point of the polyamidebenzimidazole to be formed when an acidic substance is concurrently present.

7. The process of claim 5, wherein at least one benzenedicarboxylic acid dichloride selected from the group consisting of terephthaloyl chloride and isophthaloyl chloride is reacted with 2,4-diaminodiphenylamine and meta-phenylenediamine, said reaction being performed,
(1) using a mixture of 70–15 mol percent of 2,4-diaminodiphenylamine and 30–85 mol percent of meta-phenylenediamine, when the isophthaloyl chloride content of the benzenedicarboxylic acid dichloride is within the range of 100–30 mol percent, and
(2) using a mixture of 70 mol percent to

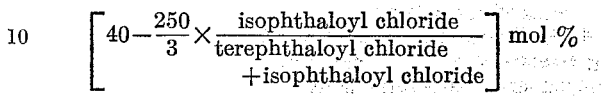

of 2,4-diaminodiphenylamine and the balance of meta-phenylenediamine, when the terephthaloyl chloride content of the benzenedicarboxylic acid dichloride is within the range of 100–30 mol percent, in an inert organic solvent, in the presence of an acid acceptor, at a temperature within the range of −20° C.–50° C.

8. Shaped articles consisting essentially of the aromatic copolyamideimine of claim 1.

9. Shaped articles consisting essentially of the aromatic copolyamideimine of claim 2.

10. Shaped articles consisting essentially of the aromatic copolyamideimine of claim 3.

11. Shaped articles consisting essentially of the copolyamidebenzimidazole of claim 4.

12. The process of claim 6 wherein said copolyamidebenzimidazole is prepared by heating a film-forming aromatic copolyamideimine consisting essentially of aromatic amideimine structural units of the formula,

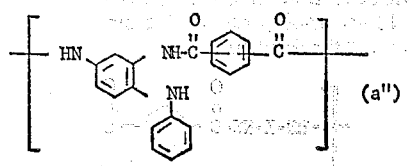

wherein each

represents a meta-phenylene group or para-phenylene group and aromatic amide structural units of the formula

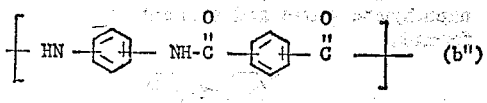

wherein

has the same meaning as in Formula a″, said copolyamideimine being further characterized in that
(1) when the meta-dicarbonylbenzene group content in the dicarbonylbenzene group of the formula

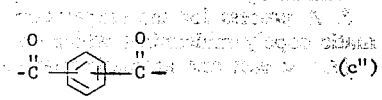

contained in the total structural units of Formulae a″ and b″ is within the range of 100–30 mol percent, the mol ratio between said aromatic amideimine structural units of Formula a″ and said aromatic amide structural units of Formula b″ is within the range of 70–15% to 30–85%, the total being invariably 100%, and (2) when the para-dicarbonylbenzene group content of the dicarbonylbenzene group of Formula c" is within the range of 100–80 mol percent, 70 mol percent–

$$\left[40-\frac{250}{3}\times\frac{\text{meta-dicarbonylbenzene group}}{\text{total dicarbonylbenzene group}}\right]$$

mol percent of the copolyamideimine is composed of said aromatic amideimine structural units of Formula a", the balance being said aromatic amide structural units of Formula b".

13. The film-forming aromatic copolyamideimine of claim 1 wherein said copolyamideimine consists essentially of 20–65 mol percent of said aromatic amideimine structural units and 80–35 mol percent of said aromatic amide structural units.

References Cited

UNITED STATES PATENTS 3,518,234   6/1970   Hara et al. _____ 260—78

HOWARD E. SCHAIN, Primary Examiner

U.S. Cl. X.R.

117—161 P; 260—30.2, 30.4 N, 30.6 R, 30.8 DS, 31.2 N, 32.4, 32.6 N, 33.4 R, 47 CP, 65; 264—331

UNITED STATES PATENT OFFICE
CERTIFICATE OF CORRECTION

Patent No. 3,647,762     Dated  March 7, 1972

Inventor(s) HARA ET AL

It is certified that error appears in the above-identified patent and that said Letters Patent are hereby corrected as shown below:

Page 3, the last formula, delete "(113)" and insert -- (114) --.

Page 5, the formula in (213), delete "CH$_2$" at the end of the formula and insert -- NH$_2$ --.

Page 6, the formula in (308), delete "OCCl" at the bottom of the formula and insert -- COCl --.

Page 13, in the table at the bottom of the page, the 1st entry under the heading "Solubility", delete "10 wt. percent" and insert -- 20 wt. percent --.

Page 14, column 28, the formula between lines 53-59, delete the formula and insert the following formula

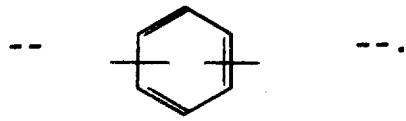

Signed and sealed this 27th day of June 1972.

(SEAL)
Attest:

EDWARD M. FLETCHER, JR.          ROBERT GOTTSCHALK
Attesting Officer                Commissioner of Patents

Disclaimer 3,647,762.—*Shigeyoshi Hara, Masao Senoo, Tsunemasa Yoshida,* and *Moriya Uchida,* Tokyo, Japan. COPOLYAMIDEIMINE AND COPOLYAMIDEBENZIMIDAZOLE, AND PROCESSES FOR THEIR PREPARATION. Patent dated Mar. 7, 1972. Disclaimer filed Aug. 30, 1971, by the assignee, *Teijin Limited.*

Hereby disclaims the portion of the term of the patent subsequent to June 30, 1987.

[*Official Gazette May 8, 1973.*]